(12) United States Patent
Freienstein et al.

(10) Patent No.: US 11,433,839 B2
(45) Date of Patent: Sep. 6, 2022

(54) DEVICE FOR A VEHICLE AND METHOD FOR FRAGMENTING A COMPONENT FOR A VEHICLE

(71) Applicant: Robert Bosch GmbH, Stuttgart (DE)

(72) Inventors: Heiko Freienstein, Weil der Stadt (DE); Mustafa Kamil, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 615 days.

(21) Appl. No.: 16/447,007

(22) Filed: Jun. 20, 2019

(65) Prior Publication Data
US 2020/0023798 A1 Jan. 23, 2020

(30) Foreign Application Priority Data
Jul. 18, 2018 (DE) .................... 10 2018 211 919.8

(51) Int. Cl.
*B60R 21/0134* (2006.01)
*B60R 21/01* (2006.01)

(52) U.S. Cl.
CPC ............. *B60R 21/0134* (2013.01); *B60R 2021/01027* (2013.01); *B60Y 2300/085* (2013.01)

(58) Field of Classification Search
None
See application file for complete search history.

(56) References Cited

U.S. PATENT DOCUMENTS 3,618,974 A * 11/1971 Chute ............... B60R 21/264
280/741
2010/0004826 A1 1/2010 Ostling et al.

FOREIGN PATENT DOCUMENTS

| CN | 2652728 Y | 11/2004 | |
|---|---|---|---|
| CN | 101318492 A | 12/2008 | |
| CN | 102765364 A | 11/2012 | |
| CN | 103204126 A | 7/2013 | |
| CN | 108001210 A | 5/2018 | |
| CN | 108146379 A | 6/2018 | |
| DE | 102013001215 A1 * | 3/2014 | ............ B60R 21/00 |
| EP | 1800962 A1 * | 6/2007 | .......... B60R 19/205 |
| EP | 2048043 A1 * | 4/2009 | ............ B60R 19/18 |
| KR | 20020078529 A * | 10/2002 | ......... B60R 21/0134 |

* cited by examiner

*Primary Examiner* — Faye M Fleming
(74) *Attorney, Agent, or Firm* — Maginot, Moore & Beck LLP

(57) ABSTRACT

The disclosure relates to a device for a vehicle. The device comprises a component for the vehicle and an explosive module. The explosive module is configured so as in response to a trigger signal to cause the component to fragment.

10 Claims, 3 Drawing Sheets

DEVICE FOR A VEHICLE AND METHOD FOR FRAGMENTING A COMPONENT FOR A VEHICLE

This application claims priority under 35 U.S.C. § 119 to application no. DE 10 2018 211 919.8, filed on Jul. 18, 2019 in Germany, the disclosure of which is incorporated herein by reference in its entirety.

TECHNICAL FIELD

The disclosure relates to a device or a method for fragmenting a component for a vehicle.

BACKGROUND

Vehicles may comprise vehicle components such as a sensor system or an element of the car body which may be arranged on or in the vehicle in a potential collision region. These vehicle components may become damaged or cause damage if the vehicle collides with another traffic participant or an obstacle.

SUMMARY

On the basis of this background, the approach presented here proposes a device for a vehicle and a method for fragmenting a component for a vehicle in accordance with the disclosure. The features described in the embodiments render possible advantageous developments and improvements of the device according to the disclosure.

The present approach proposes a device by means of which in the case of a collision of a vehicle it is possible to reduce damage that may occur as a result of the collision. For this purpose, a component of the vehicle may be fragmented into multiple where appropriate, small parts in order by means of fragmenting the component to advantageously obviate or avoid damage to the vehicle or to an object involved in the collision, such as another traffic participant. It is advantageously possible by virtue of the fragmentation of the component to minimize or prevent damage that may otherwise be caused by for example the mass, the geometric shape, the size or the installation site of the fragmented component, this increases the traffic safety and may have a cost-saving effect in the case of a collision.

A device for a vehicle is proposed. The device comprises a component for the vehicle and an explosive module. The explosive module is configured so as in response to a trigger signal to cause the component to fragment.

The term 'vehicle' may be understood to mean a motor vehicle, by way of example a car, a bus, a commercial vehicle or a transportation vehicle for transporting goods or people. The vehicle may be configured as a vehicle having an autonomous drive operation, in other words as a driverless vehicle, by way of example in the form of a self-driving motor vehicle. The device may be understood to be a component that comprises the explosive module. In this case, the component may be a component that is already installed in vehicles. The device may comprise as a component for the vehicle by way of example a sensor system such as a LiDAR environment sensor or a radar sensor. Alternatively, the device may comprise as a component by way of example a vehicle part such as a headlamp housing, or the component may be a part of the vehicle body such as a bumper.

The device may also be configured so as in response to the trigger signal to fragment a plurality of components, or the vehicle may comprise multiple devices in order to fragment multiple components. The explosive module may be configured so as to fragment the component into multiple small parts. In this case, the fragmentation procedure may be adjusted such that the component is fragmented into parts that with respect to their size and weight minimize any damage in the case of a collision of the vehicle. The trigger signal may by way of example indicate an impact effect that is acting on the vehicle and that occurs in the case of a collision with another vehicle, traffic participant or obstacle. The trigger signal may also be configured so as to indicate an imminent impact effect, by way of example based on an imminent collision by detected by a sensing device of the vehicle, in order to indicate the fragmentation of the component even prior to the collision so as to minimize the damage. The trigger signal may be an electrical signal or a radio signal. In addition, the trigger signal may represent a signal that is detected by using a sensing device. The trigger signal may be configured to control the explosive module so as to fragment the component.

In the installed state, the component may be arranged in a region of the vehicle where collisions may occur with foreign objects. By way of example, the component may represent an external bodywork part of the vehicle or may be provided and/or shaped so as to be arranged on an external bodywork part of the vehicle. It may be particularly expedient to fragment such components so as to increase the operational safety of the vehicle.

In accordance with one embodiment, the component of the vehicle may be an environment sensing device or an illuminating device. In the form of an environment sensing device, the component may comprise by way of example a sensor housing and a LiDAR sensor, a radar sensor or a mono- and stereo camera. In the form of an illuminating device, the component may comprise by way of example a headlamp housing and at least one light source. The environment sensing device and the illuminating device may be arranged on outer edges of the vehicle. By virtue of the environment sensing device or the illuminating device fragmenting in response to the trigger signal, it is advantageously possible regardless of the installation site relating to the function of the component and regardless of the shape of the component to minimize damage to the vehicle and in addition or alternatively to minimize the damage to the collision partner.

In addition, the component in accordance with one embodiment may also be a structural part of the vehicle. In the case of a structural part of the vehicle, it may be by way of example a vehicle part that yields slightly in the case of a collision, such as a bumper, a longitudinal beam or a transverse beam or another bodywork component. This embodiment also provides advantages with regard to minimizing damage in the case of a collision.

In accordance with one embodiment, the explosive module may comprise at least one pyrotechnic explosive capsule. The explosive capsule may comprise a pyrotechnic module so as to cause the component to fragment by means of a pyrotechnic effect. The explosive capsule may be arranged in the region of the component. The explosive module may also comprise a plurality of explosive capsules. The explosive module may be configured so as in response to the trigger signal to trigger the at least one explosive capsule so as to cause a pyrotechnic effect in order to fragment the component. It is advantageously possible in this manner to cause the component to fragment in a particularly simple and cost-effective manner.

In accordance with one embodiment, the explosive module may also be fastened to the component of the vehicle. If the explosive module comprises the explosive capsule, the explosive capsule may be fastened by way of example to the component, by way of example to a housing of the component. If the explosive module comprises by way of example a plurality of explosive capsules, it is also possible so as to uniformly fragment the component to arrange multiple explosive capsules uniformly spaced apart around the components and to fasten said multiple explosive capsules to the component. Alternatively, it is also possible to arrange multiple explosive capsules distributed in an irregular pattern around the component, by way of example in order to fragment the component into different sized parts. Advantageously, the explosive module may be fastened to the component in a space-saving manner and this renders it possible for the component to fragment in a particularly efficient manner In accordance with one embodiment, the device may also comprise a shielding device. The shielding device may be configured so as to shield an element of the component prior to the fragmentation procedure. Consequently, it is advantageously possible using the shielding device to protect an element of the component prior to the fragmentation procedure. For this purpose, the shielding device may be by way of example a protective cell that is arranged around the element of the component. The shielding device may be shaped as an inseparable unit that in the case of a fragmentation procedure protects the element of the component in such a manner that said element may be by way of example reused. Consequently, it is advantageously possible to shield a particularly valuable or expensive element prior to the fragmentation procedure, which saves costs. If the component is by way of example the environment sensing device having the LiDAR sensor, then the shielding device may be configured to shield such an element by way of example as a detector or laser module of the environment sensing device.

Moreover, the device in accordance with one embodiment may comprise a capture device. The capture device may be shaped so as to catch individual items of the component after the fragmentation procedure. The capture device is by way of example shaped in the form of a capture net. The capture device may by way of example surround the entire component and be shaped so as to catch all the individual parts of the component after the fragmentation procedure. The individual parts of the component that are caught in the capture device may represent in this manner a flexible mass, as a result of which it is possible to minimize the damage during the fragmentation procedure. The capture device may simultaneously advantageously group together the individual parts of the component after the fragmentation procedure, which makes it easier to locate and reuse the most valuable individual parts. In addition, it is thus also possible to subsequently analyze the fragmented component for the purpose of improving the design of the component in future manufacturing generations in order by way of example to determine other fastening techniques or other geometric shapes of the component.

The component may comprise in accordance with one embodiment a housing, a transmitter device that is arranged in the housing so as to transmit a sensor beam, and optionally a mirror that is arranged in the housing so as to deflect the sensor beam. The explosive module may be configured so as to fragment the housing into at least two parts during the fragmentation procedure. The component may be by way of example an environment sensing device. The housing may completely or in part encase the environment sensing device. The housing may also represent an outer sleeve of the component. The transmitter device may be a laser and detector cell. The sensor beam may be a laser beam. the mirror may be a mirror that rotates about an axis of rotation. The explosive module may be configured so as to fragment all the mentioned elements of the component into individual parts or not to fragment one of the mentioned elements, such as by way of example the laser and detector cell, in particular if the element is shielded by way of example by means of the shielding device.

In accordance with one embodiment, the device may also comprise a supply device. The supply device may be configured in order to provide the trigger signal in response to an impact effect that is currently acting on the vehicle and/or in response to an impact effect that is expected to act on the vehicle. Consequently, the term "an impact effect that is acting on the vehicle" may be understood to mean an impact effect that will occur in the future, is currently occurring or has already occurred. The supply device may comprise a sensor for detecting a currently occurring impact effect or an impact effect that is expected to occur, said sensor may be connected to a corresponding sensor or may receive information provided by a corresponding sensor. The supply device may be in addition or alternatively the component, by way of example the environment sensing device. In addition, the supply device may be a control device that is configured to control the explosive module so as to cause the component to fragment. Advantageously, the trigger signal may be provided in this manner based on a vehicle sensor system such as an internally installed inertial sensor system so as to minimize the trigger latency. The trigger signal may also be provided based on the sensor detecting a rapidly approaching object and in addition or alternatively in the case of a high EGO speed of the vehicle, as a result of which the trigger signal may be advantageously provided prior to an imminent collision. This renders possible so to speak an "anticipated trigger", e.g. if an environment sensor detects an object that is approaching at a high speed and consequently renders it possible to create an advantage with respect to time for the fragmentation procedure.

In addition, a method for fragmenting a component for a vehicle is proposed. The method comprises a registering step and an inducing step. In the registering step, the method registers a trigger signal that indicates an impact effect that is acting on the vehicle. In the inducing step, the method in response to the trigger signal being registered causes the component to fragment by using an explosive module.

This method may be implemented by way of example in software or hardware or in a mixture of software and hardware by way of example in a control device.

Exemplary embodiments of the approach presented here are illustrated in the drawings and further explained in the description below. In the drawings:

In an advantageous embodiment of the method of the present disclosure, prior to the inducing step being performed a step of preparing the component is performed.

In this step, the component is switched from an active state into a prepared state.

In the active state, the component functions according to its intended task. For an environment sensor having a sensing device, this may mean by way of example that the sensing device is configured in such a manner that it is possible to detect the environment.

In the prepared state, the intended task cannot be performed or can only be performed in a limited manner by the component. For an environment sensor having a sensing device, this may mean by way of example that the sensing device is configured in such a manner that the shielding device protects the sensing device and therefore the environment is not detected or is only detected in a limited manner by the sensing device.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
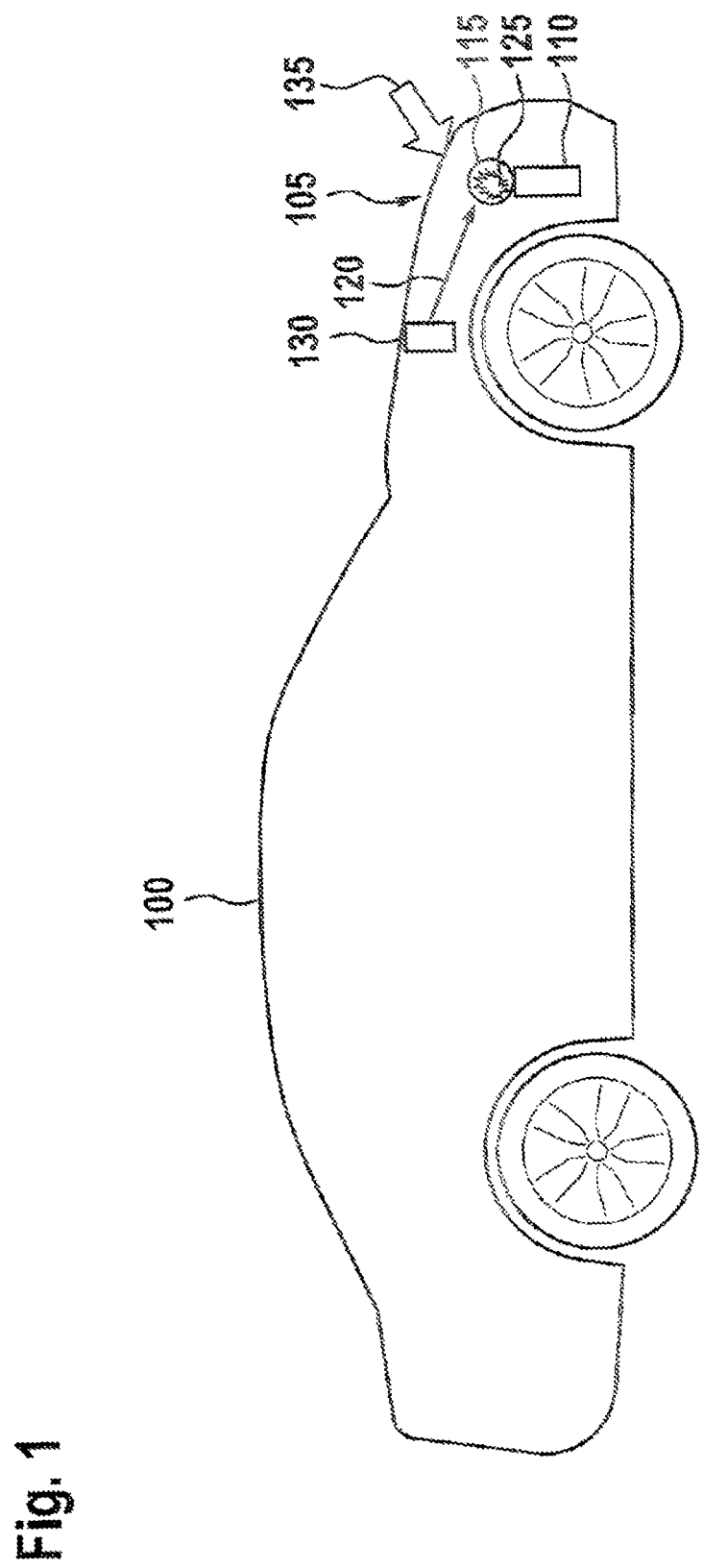
FIG. 1 illustrates a schematic view of a vehicle having a device in accordance with an exemplary embodiment.

In the following description of advantageous exemplary embodiments of the present disclosure, like or similar reference numerals are used for the elements that are illustrated in the different figures and function in a similar manner, wherein a description of these elements is not repeated.

FIG. 1 illustrates a schematic illustration of a vehicle 100 having a device 105 in accordance with one exemplary embodiment. The device 105 comprises a component 110 for the vehicle 100 and an explosive module 115. The explosive module 115 is configured so as in response to a trigger signal 120 to cause the component 110 to fragment. In accordance with one exemplary embodiment, the trigger signal 120 represents a signal that is provided in response to the detection of an impact effect 135 that is acting on the vehicle 100. In this case, the trigger signal 120 is then provided in accordance with one exemplary embodiment in particular if the impact effect 135 occurs or is expected at a position at which the device 105 is installed.

By way of example, the device 105 is illustrated as a device 105 that is installed in a front bumper of the vehicle 100. Other possible installation positions include by way of example a rear bumper or door regions of the vehicle 100, in particular such positions that lie in the region of direct influence of a possible collision.

In accordance with one exemplary embodiment, the component 110 is an environment sensing device or an illuminating device. In accordance with a further exemplary embodiment, the component 110 is a structural part of the vehicle.

The explosive module 115 comprises in accordance with the exemplary embodiment illustrated here a pyrotechnic explosive capsule 125. Optionally, the explosive module 115 is in addition fastened by way of example adhered directly to the component 110 as illustrated in the figure. In this case, the trigger signal 120 is suitable for causing the explosive capsule 125 to detonate.

The vehicle 100 comprises in accordance with the exemplary embodiment illustrated here a supply device 130. The supply device 130 is configured to provide the trigger signal 120 in response to an impact effect 135 that is acting on the vehicle. The supply device 130 is optionally also configured as part of the device 105. In addition or alternatively, the component 110 is the supply device 130 in accordance with one exemplary embodiment. The supply device 130 comprises by way of example a suitable sensor system for detecting the impact effect 135 or a suitable evaluating device that is configured by way of example so as to evaluate at least one sensor signal of the sensor system and based on the evaluation to provide or not provide the trigger signal 120. Such an evaluating device is installed by way of example in a control device of the vehicle 100.

In accordance with the exemplary embodiment illustrated here, the explosive module 115 is configured so as to register the trigger signal 120. In addition, the explosive module is configured so as in response to the trigger signal 120 being registered to cause the component 110 to fragment. The trigger signal 120 represents by way of example an ignition signal that provides an ignition current for igniting the explosive module 115 or causes such an ignition current to be provided.

If the vehicle 100 collides with another vehicle or with an unprotected traffic participant, by way of example a pedestrian or a cyclist, the components 110 of the vehicle 100, such as a sensor on a vehicle outer edge, represents a reduced risk, despite its mass, its geometric shape, its installation site and the impacting forces, by virtue of the fact that the explosive module 115 causes the component 110 to fragment. Also a rigidity of a sensor housing, the lack of a compensation zone on the sensor housing or also an accelerated sensor mass itself in terms of a free-flying projectile represent a smaller potential source of danger after a suitable fragmentation procedure. By means of using the device 105, both damage that occurs in the case of a collision of the vehicle 100 is advantageously minimized and also hitherto protective measures are increased for unprotected traffic participants, such as by way of example pedestrians.

In accordance with the exemplary embodiment illustrated in the figure, the fragmentation of the component 110 is brought about by means of the pyrotechnic explosive capsule 125 of the explosive module 115. In this case, it is possible to use as the explosive capsule 125 by way of example a pyrotechnic explosive capsule as is already used as standard for airbags or safety belts. By means of fragmenting the component 110, it is rendered possible to considerably reduce a potential damage/injury in the case of accidents involving unprotected traffic participants and also to minimize damage to the EGO vehicle or rather to the vehicle involved in the accident. The component 110, by way of example in the form of a compact sensor housing, is in this case fragmented into small and light individual parts. The explosive capsule 125 is triggered in response to the trigger signal 120. The trigger signal 120 indicates the impact effect 135 that is acting on the vehicle 100, such as potentially occurs in the case of a collision, or said trigger signal is produced in response to such an impact effect 135 being detected. The trigger signal 120 is based optionally on an external signal by way of example provided by acceleration sensors for triggering airbags of the vehicle 100. In addition or alternatively, the trigger signal 120 is produced directly by the component 110, by way of example if the component 110 is configured as an environment sensing device or comprises an environment sensing device. By way of example, the trigger signal 120 is provided by means of an inertial sensor system that is installed internally in the component 110. As a consequence, it is possible to minimize the trigger latency. The trigger signal 120 is optionally produced when an object is rapidly approaching the vehicle 100 and in addition or alternatively when the vehicle 100 is traveling at a higher EGO speed and static objects are located in front of the vehicle 100. This provides a temporal advantage since the fragmentation of the component may be initiated even prior to an impact, which saves time. In one embodiment of the method, it is possible to fragment all components 110 that are located in potentially dangerous installation sites, such as sensors, at the latest as a collision of the vehicle 100 occurs in order to provide an early protective function.

Figure 2:
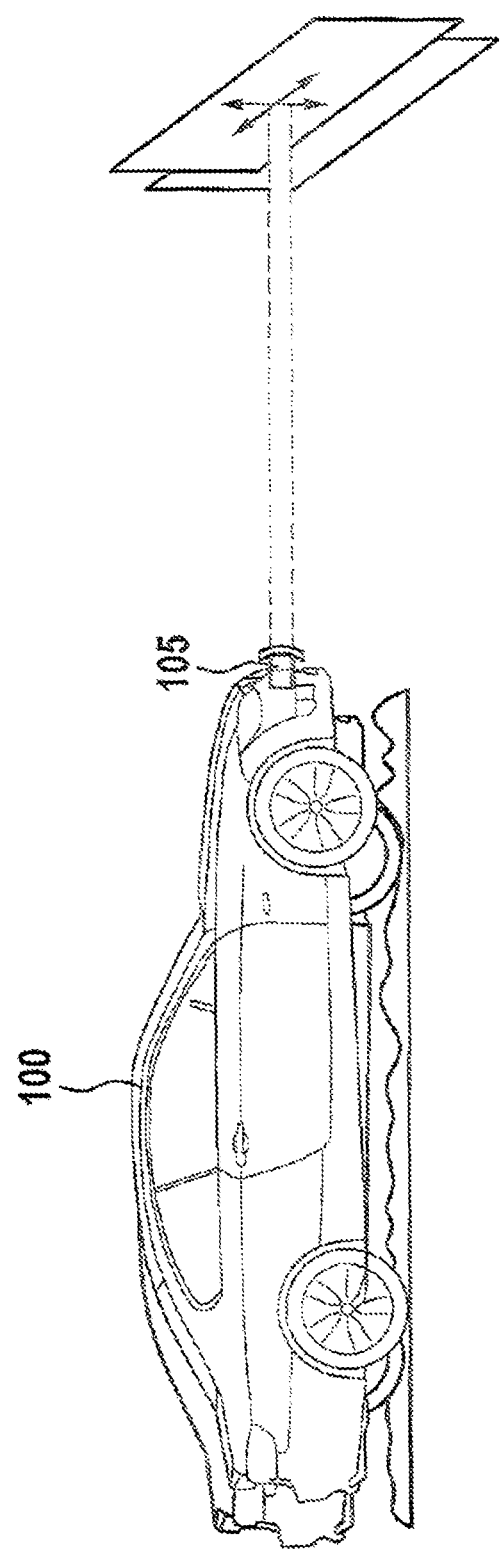
FIG. 2 illustrates a schematic view of a vehicle having a device in accordance with an exemplary embodiment.

FIG. 2 illustrates a schematic illustration of a vehicle 100 having a device 105 in accordance with one exemplary embodiment. The figure illustrates an exemplary arrangement of the device 105 on the vehicle 100, wherein the device 105 is similar or corresponds to the device described with reference to FIG. 1. The illustration in the figure shows by way of example a typical installation site of the device 105 in the vehicle front of the vehicle 100. In addition or alternatively, the device 105 may also be arranged on the sides, in the rear by way of example on the bumper, in the side mirrors, behind the windscreen or on the roof of the vehicle 100, depending upon the arrangement and shape of the component for the vehicle 100, i.e. depending upon the component that may be fragmented by means of the explosive module. With the increasing automation of current and future manufacturing generations of motor vehicles, it is possible to rely directly on environment sensors such as camera systems, radar systems, LiDAR systems, ultrasonic sensor systems or the like. These environment sensors are by way of example integrated as a component in the device 105 illustrated in the figure, by way of example by means of an inside-out-configuration. In this case, said device may be integrated in the vehicle 100 on the basis of an improved detection situation protruding into the outer edges of the vehicle 100, as is illustrated in the present FIG. 2. In accordance with this exemplary embodiment, one component that is part of the device 105 and is integrated by way of example in the vehicle front in a bumper protrudes in part from the vehicle body. Also with regard to a development in the field of mobility solutions, such as shuttle buses or robotic taxis, and an integration of optionally multiple environment sensors per vehicle 100, it is advantageous to use the device 105 with regard to reducing any damage that occurs or with regard to protective measures for unprotected traffic participants, such as pedestrians.

Figure 3:
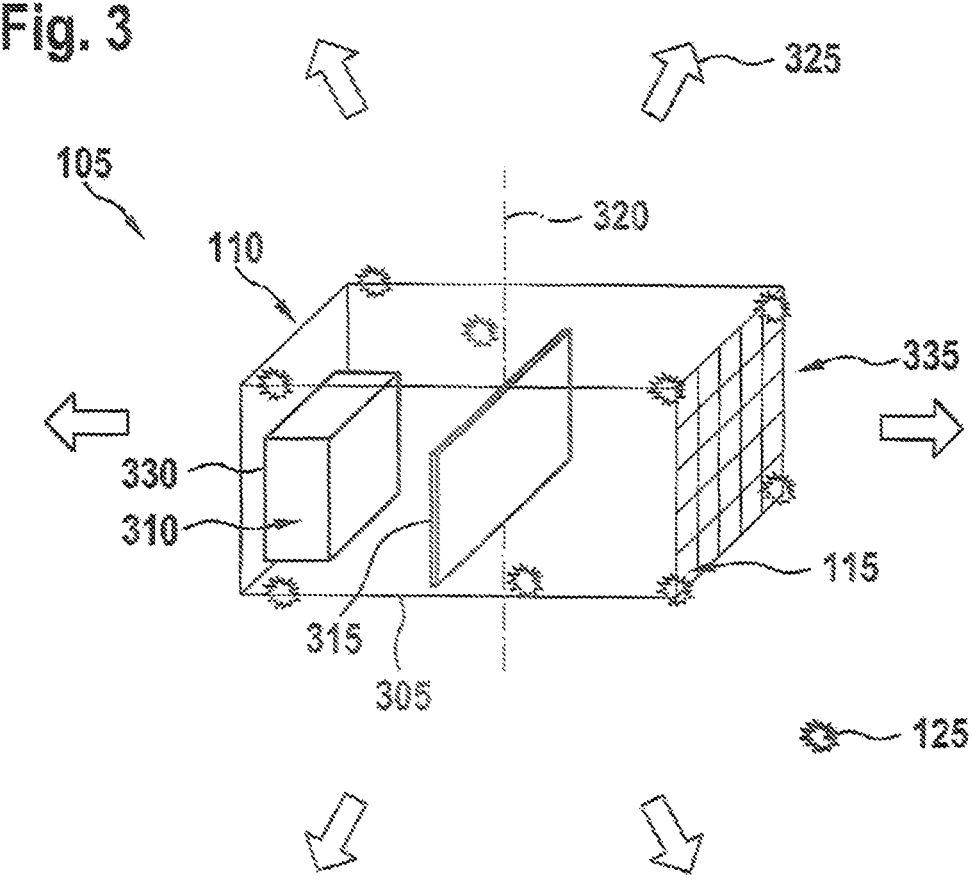
FIG. 3 illustrates a schematic view of a device in accordance with an exemplary embodiment.

FIG. 3 illustrates a schematic view of a device 105 in accordance with one exemplary embodiment. The device 105 illustrated here is by way of example an exemplary embodiment of the device described with reference to FIG. 1. The component 110 comprises in accordance with the exemplary embodiment illustrated in the figure a housing 305, a transmitter device 310 that is arranged in the housing 305 so as to transmit a sensor beam, and a mirror 315 that is arranged in the housing 305 so as to deflect the sensor beam. The explosive module 115 is configured so as to fragment the housing 305 into at least two parts.

The explosive module 115 comprises here by way of example a multiplicity of pyrotechnic explosive capsules 125. The illustrated explosive capsules 125 experiences during the triggering procedure an explosive reaction of a pyrotechnic capsule. The component 110 is configured in this case by way of example as a LiDAR environment sensor, the transmitter device 310 is configured accordingly as a laser detector cell and the mirror 315 is illustrated as a rotating mirror having an axis of rotation 320. The explosive capsules 125 are arranged on the housing 305. Each corner of the housing 305 comprises by way of example one of the explosive capsules 125, in addition in each case one of the explosive capsules 125 are arranged in the region of the axis of rotation 320 of the mirror 315, approximately in the middle of a longitudinal axis of the rectangular block-shaped housing 305 on two of the illustrated side surfaces. The fragmentation of the component 110 is represented in the present FIG. 3 by means of arrows 325 that issue in a radial manner from the component 110.

In accordance with one exemplary embodiment, the device 105 comprises a shielding device 330. The shielding device 330 is configured so as to shield an element of the component 110 prior to the component 110 fragmenting. In the exemplary embodiment illustrated here, the transmitter device 310 is shielded as an element of the component 110. The shielding device 330 forms a protective cell and the element of the component 110 is configured by way of example in the form of an element housing that cannot fragment during the fragmentation of the component 110 by means of the explosive module 125. In order to prevent a complete fragmentation of all, possibly valuable, elements of a component 110 such as the transmitter device 310 that is illustrated here as a sensor component, the shielding device 330 in the form of a "protective cell" around the most valuable components is able in the case of the LiDAR environment sensor illustrated by way of example here to provide a mechanical protection around the detector and laser module 310 prior to the exploding process. Consequently, the protected elements of the component 110 do not fall apart and are not destroyed. The shielding device 330 is then an inseparable unit that groups together and mechanically protects the parts that are worthy of protection. It would thus be possible to reuse the element of the component 110.

In addition, the device 105 illustrated here comprises a capture device 335. The capture device 335 is shaped so as to catch individual items of the component 110 after the fragmentation procedure. The capture device 335 is optionally shaped in the form of a capture net. Such a capture net may be wound around the said housing 305 in order to render possible a high-ranking grouping for all elements of the component 110. The fragmented component 110, in the exemplary embodiment illustrated here the fragmented LiDAR environment sensing device, in the capture net of the capture device 335, represents a more flexible mass after the fragmentation procedure and provides a better protective effect, in this case the capture device 335 holds all elements 305, 310 315 together. One advantage in this case is that it is both easier to locate and reuse the most valuable elements and also to subsequently analyze the fragmented component 110 for the purpose of improving the design of the component 110 in future manufacturing generations in order by way of example to determine other fastening technics and other geometric shapes of the component.

Alternatively, the capture device 335 may be arranged only on one or multiple sides of the housing 305 in order to prevent parts that have become fragmented from penetrating the areas that are to be protected, by way of example a passenger compartment or an engine compartment of the vehicle.

Figure 4:
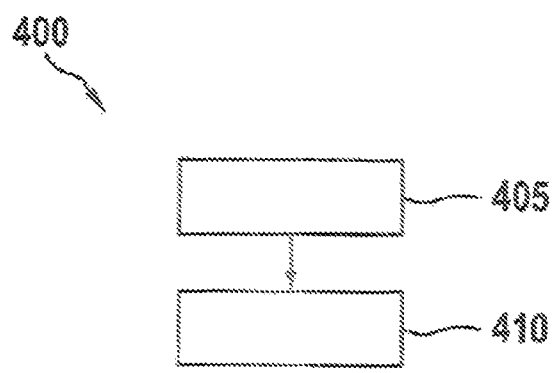
FIG. 4 illustrates a flow diagram of a method for fragmenting a component for a vehicle in accordance with an exemplary embodiment.

FIG. 4 illustrates a flow diagram of a method 400 for fragmenting a component for a vehicle in accordance with an exemplary embodiment. The method 400 comprises a registering step 405 and an inducing step 410. In the registering step 405, the method registers a trigger signal that indicates an impact effect that is acting on the vehicle. In the inducing step 410, the method causes a component to fragment in response to the trigger signal being registered. The steps 405, 410 of the method may be performed using modules/devices of a device that is described with reference to the preceding figures.

What is claimed is:

1. A device for a vehicle, the device comprising:
   a component for the vehicle, the component including (i) a housing, (ii) a transmitter device arranged in the housing and configured to transmit a sensor beam, and (iii) a mirror arranged in the housing and configured to deflect the sensor beam; and
   an explosive module configured to, in response to a trigger signal, cause the housing to fragment into at least two parts.

2. The device according to claim 1, wherein the component is one of (i) shaped so as to be arranged on an external bodywork part of the vehicle and (ii) an external bodywork part.

3. The device according to claim 1, wherein the component is one of (i) an environment sensing device and (ii) an illuminating device.

4. The device according to claim 1, wherein the component is a structural part of the vehicle.

5. The device according to claim 1, wherein the explosive module has a pyrotechnic explosive capsule.

6. The device according to claim 1, wherein the explosive module is fastened to the component of the vehicle.

7. The device according to claim 1 further comprising:
   a shielding device configured to shield an element of the component prior to the component fracturing.

8. The device according to claim 1 further comprising:
   a capture device shaped to catch individual parts of the component after the component fractures.

9. The device according to claim 1 further comprising:
   a supply device configured to supply the trigger signal in response to an impact effect that is at least one of (i) currently acting on the vehicle and (ii) expected to act on the vehicle.

10. A method for fragmenting a component for a vehicle, the component including (i) a housing, (ii) a transmitter device arranged in the housing and configured to transmit a sensor beam, and (iii) a mirror arranged in the housing and configured to deflect the sensor beam, the method comprising:
    registering a trigger signal that indicates an impact effect that is acting on the vehicle; and in response to the trigger signal being registered, inducing a fragmentation of the housing into at least two parts using an explosive module.

* * * * *